(12) United States Patent
Manley

(10) Patent No.: US 11,085,427 B2
(45) Date of Patent: Aug. 10, 2021

(54) PULSATION DAMPENER UTILIZING A CHARGLESS MITIGATION DEVICE

(71) Applicant: Justin P. Manley, Murphy, TX (US)

(72) Inventor: Justin P. Manley, Murphy, TX (US)

( * ) Notice: Subject to any disclaimer, the term of this patent is extended or adjusted under 35 U.S.C. 154(b) by 0 days.

(21) Appl. No.: 15/935,024

(22) Filed: Mar. 25, 2018

(65) Prior Publication Data

US 2019/0293058 A1   Sep. 26, 2019

(51) Int. Cl.
*F04B 11/00* (2006.01)
*F16L 55/04* (2006.01)

(52) U.S. Cl.
CPC ......... *F04B 11/0008* (2013.01); *F04B 11/00* (2013.01); *F04B 11/0091* (2013.01); *F16L 55/04* (2013.01)

(58) Field of Classification Search
CPC ............. F04B 11/0008; F04B 11/0091; F04B 11/0033; F04B 11/00–0091; F16L 55/04–055
See application file for complete search history.

(56) References Cited

U.S. PATENT DOCUMENTS

| | | | |
|---|---|---|---|
| 4,186,776 A * | 2/1980 | Burton | F15B 1/165 138/30 |
| 6,076,557 A * | 6/2000 | Carney | F15B 1/103 138/30 |
| 7,874,317 B1 * | 1/2011 | Kulikov | F16L 55/041 137/207 |
| 2011/0017332 A1 * | 1/2011 | Bartsch | B60T 8/4068 138/30 |
| 2011/0116940 A1 * | 5/2011 | Kabir | F04B 39/0027 417/313 |
| 2017/0067456 A1 * | 3/2017 | Manley | F04B 11/0008 |
| 2017/0211741 A1 * | 7/2017 | Smith | F15B 1/04 |
| 2018/0328322 A1 * | 11/2018 | Kashiwagi | F02M 37/0041 |

* cited by examiner

*Primary Examiner* — Devon C Kramer
*Assistant Examiner* — Thomas Fink
(74) *Attorney, Agent, or Firm* — Wilson Daniel Swayze, Jr.

(57) ABSTRACT

A pulsation dampener to dampen pulsations in a fluid may include a dampener body to dampen the fluid; an channel flange section connected to the dampener body for the fluid to enter the dampener body.

9 Claims, 7 Drawing Sheets

PULSATION DAMPENER UTILIZING A CHARGLESS MITIGATION DEVICE

BACKGROUND

Technical Field

The present disclosure relates to pulsation dampeners and more particularly to an improved pulsation dampener that employs a dampener device in lieu of a conventional diaphragm and compressible gas.

As widely known in the art, positive displacement pumps generate pulsating fluid flows that severely age and damage the pump components as well as the inline instrumentation the pump employs. In an effort to subdue these haphazard pressure spikes, conventional gas-charged pulsation dampeners are employed, which in turn utilize the compressibility of gas to absorb the pressure from the fluid being pumped. This is accomplished through installing a rubber diaphragm inside a pulsation dampener and filling it with gas, specifically nitrogen gas. The inherent problem with this design is the failure of the diaphragm, which releases the compressible gas, leaving the pulsation dampener completely ineffective. As a result of this failure, an operator needs to shut down the operations of the pump for maintenance. Secondly, the amount of pre-charge within the pulsation dampener needs to be constantly adjusted to an optimum level. This is because, in the event of the pre-charge being too high, the dampener will self-seal leading to ineffective dampening and even diaphragm failure and, on the other hand, in the event of the pre-charge being too low, the gas can no longer compress to an optimum point resulting in, again, ineffective dampening.

Hence, there is a strong, long-felt but unresolved need for a pulsation dampener, which addresses the aforementioned operational issues, which include failure of the diaphragm and constant pre-charge adjustment and monitoring.

SUMMARY

The present invention addresses the aforementioned problems of the prior art by teaching a dampener device deployed within a pulsation dampener, which is applied downstream of a positive displacement pump. The dampener device is installed in lieu of a gas cushion of the pulsation dampener wherein, the gas cushion comprises the diaphragm and the compressible gas locked in by the diaphragm.

The dampener device comprises a resilient dampener basket which may be formed from flexible rubber and which may be installed within the housing of the pulsation dampener in lieu of the gas cushion thereof, which comprises the diaphragm and the compressible gas locked in by the diaphragm. The dampener device further comprises compressible layers positioned within the dampener basket wherein, each layer is made up of a plurality of wedges, compressible segments. Each segment comprises a closed-cell, rubber foam piece infused with a multiplicity of microcells of gas, which preferably comprises nitrogen. Each segment further comprises a plurality of exterior depressions disposed on all sides thereof.

The pulsating fluid, upon entering the dampener basket, permeates between the layers and between every two wedge segments causing them to be free from each other. Further, as the segments pertaining to all the three layers are enveloped by the pressurized fluid, each segment is compressed on all sides, especially at the depressions. As a result, the segments absorb the fluid pressure and thereby dampen the pulsating fluid flow as it exits the pulsation dampener. Thus, in the present invention, as the dampener device does not retain pressure (as the diaphragm of the prior art), the life of the pulsation dampener is greatly improved. Further, the present invention completely does away with the concept of pre-charging as there's no gas cushion employed.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the accompanying drawings, which form a part of this disclosure, wherein.

DETAILED DESCRIPTION

Figure 1:
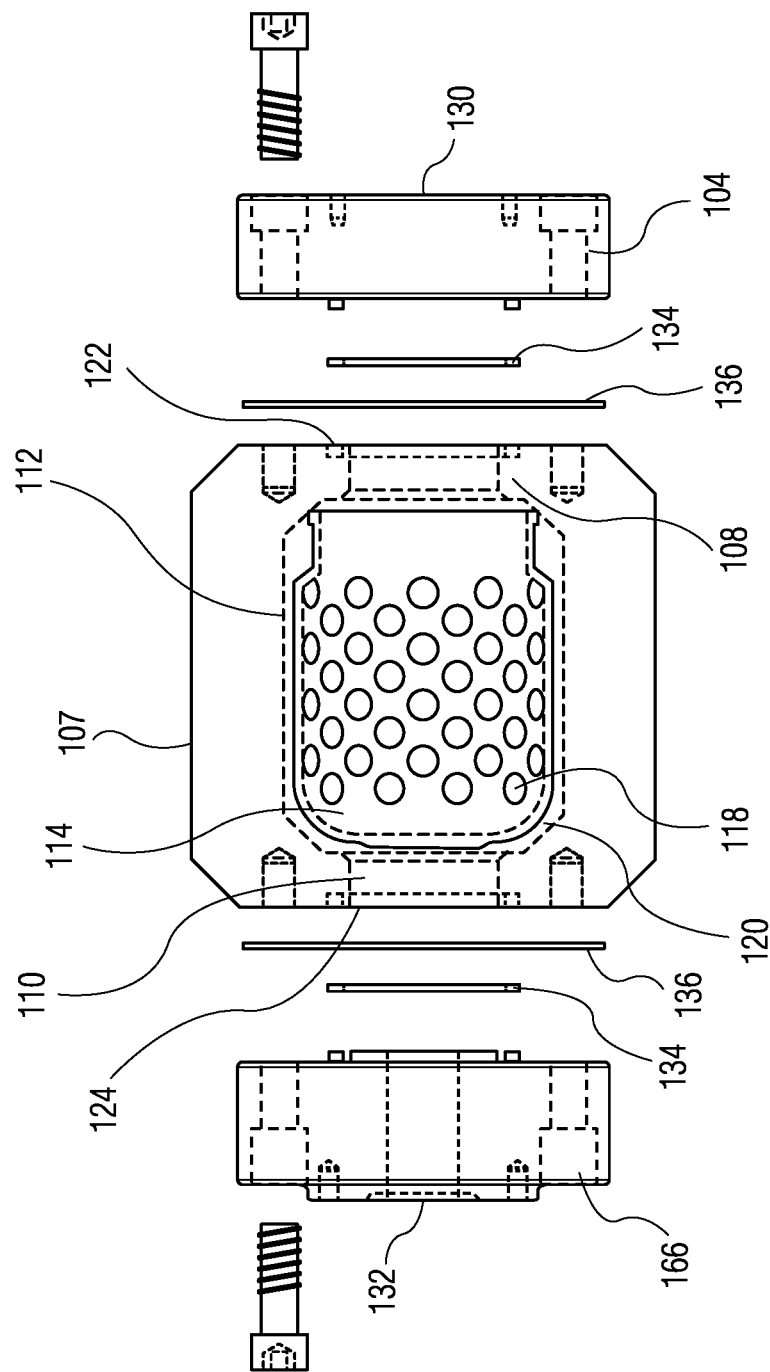
FIG. 1 illustrates an exploded view of the pulsation dampener of the present invention.

FIG. 1 illustrates a side view of the pulsation dampener of the present invention and illustrates the dampener device 102, the solid flange section 104 and the channel flange section 106.

The dampener device 102 may include a basket device 112 which may hold a multitude of segments 184, and the basket device 112 may include a basket wall 116 to form a basket housing 120 which may be shaped in a cylinder or other shape to define a basket cavity 118 to hold the segments 184.

The basket device 112 may include an entrance basket section 108 which may be a first narrowed section having a seal ring groove 122 to connect to the solid flange section 104 which may have a solid flange 130 to allow the multitude of segments to enter the basket cavity 118 through the entrance basket section 108.

The dampener device 102 may include an inlet channel section 110 which may be a second narrowed section having a seal ring groove 124 to connect to the channel flange section 106 which may have an exit aperture 132 to allow the fluid to enter and exit the basket cavity 118 through the inlet channel section 110.

A ring seal 134 and a gasket 136 may be positioned between the solid flange section 104 and the dampener device 102 and another ring seal 134 and the gasket 136 may be positioned between the channel flange section 106 and the dampener device 102.

The fluid may enter section 110 the channel flange section 106, then enter the basket cavity 118, and interact with the segments 184, then exit the basket cavity 118, then exit the inlet channel section 110 and then exit the channel flange section 106.

Figure 2:
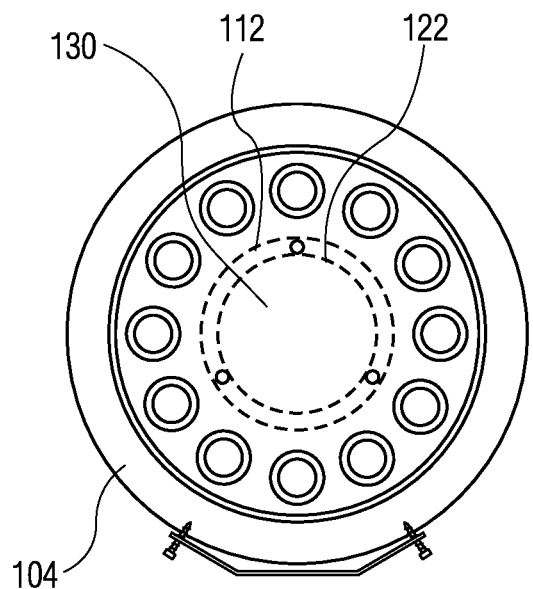
FIG. 2 illustrates an end view of the solid flange section of the pulsation dampener of the present invention.

FIG. 2 illustrates a front view of the solid flange section 104 which may be substantially a cylinder or other appropriate shape and the solid flange section 104 may engage the basket device 112 and more particularly the seal ring groove 122. The solid flange section 104 may include a multitude of entrance apertures 151 which may cooperate with a fastener to connect with the dampener device 102.

Figure 3:
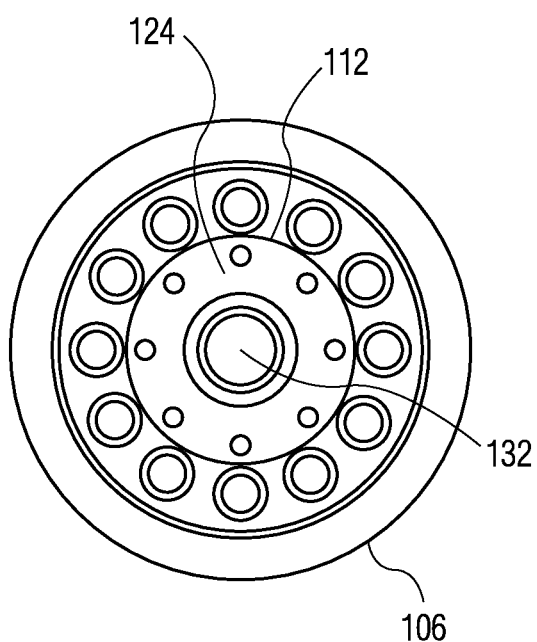
FIG. 3 illustrates an end view of the channel flange section of the pulsation dampener of the present invention.

FIG. 3 illustrates a front view of the channel flange section 106 which may be substantially a cylinder or other appropriate shape and the channel flange section 106 may engage the basket device 112 and more particularly the seal ring groove 124. The channel flange section 106 may include a multitude of entrance apertures 151 which may cooperate with a fastener to connect with the dampener device 102.

Figure 4:
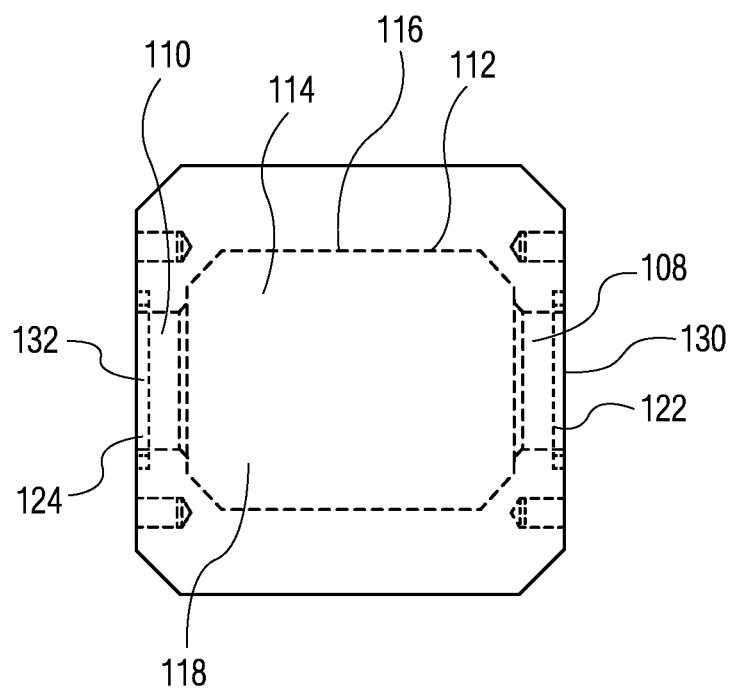
FIG. 4 illustrates a side view of the dampener device of the present invention.

The dampener device 102 which may be shown in FIG. 4 as a cross-section and may include a basket device 112 which may hold a multitude of segments 184, and the basket device 112 may include a basket wall 116 to form a basket housing 120 which may be shaped in a cylinder or other shape to define a basket cavity 118 to hold the segments 184.

The basket device 112 may include an entrance basket section 108 which may be a first narrowed section having a seal ring groove 122 to connect to the solid flange section 104 which may have an solid flange 130 to allow the segments to enter the basket cavity 118 through the entrance basket section 108.

The basket device 112 may include an inlet channel section 110 which may be a second narrowed section having a seal ring groove 124 to connect to the channel flange section 106 which may have an exit aperture 132 to allow the fluid to exit the basket cavity 118 through the inlet channel section 110.

Figure 5:
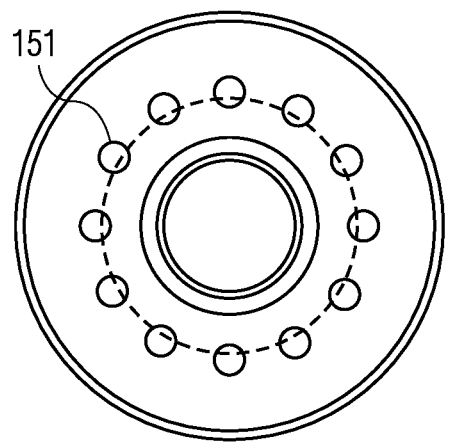
FIG. 5 illustrates an end view of the dampener device of the present invention.

FIG. 5 illustrates an end view of the dampener device 102.

The fluid may enter at the bottom of the pulsation damper, then enter the inlet channel section 110, then enter the basket cavity 118, and interact with the segments 184, then exit the basket cavity 118, then exit the inlet channel section 110 and then exit the channel flange section 106.

Figure 9:
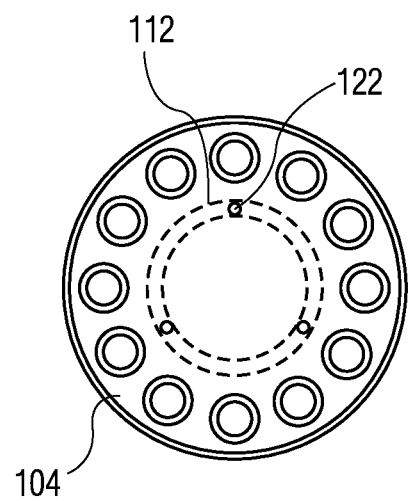
FIG. 9 illustrates an end view of the solid flange section of the present invention.

FIG. 9 illustrates a top view of the solid flange section 104 which may be substantially a cylinder or other appropriate shape and the solid flange section 104 may engage the basket device 112 and more particularly the seal ring groove 122. The solid flange section 104 may include a multitude of entrance apertures 151 which may cooperate with a fastener to connect with the dampener device 102.

Figure 8:
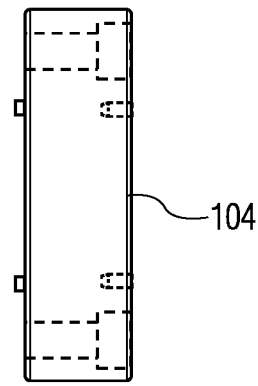
FIG. 8 illustrates a side view of the solid flange section of the present invention.

FIG. 8 illustrates a side view of the solid flange section 104.

Figure 7:
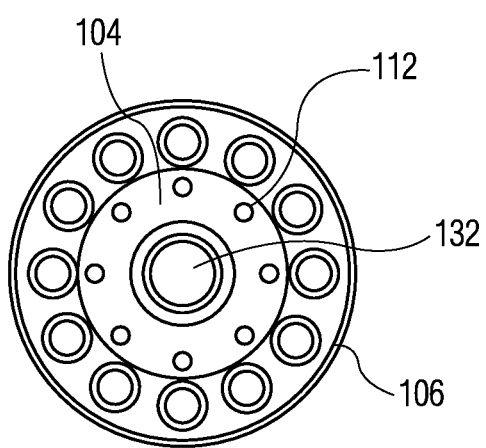
FIG. 7 illustrates an end view of the channel flange section of the present invention.

FIG. 7 illustrates a front view of the channel flange section 106 which may be substantially a cylinder or other appropriate shape and the channel flange section 106 may engage the basket device 112 and more particularly the seal ring groove 124. The channel flange section 106 may include a multitude of entrance apertures 151 which may cooperate with a fastener to connect with the dampener device 102.

Figure 6:
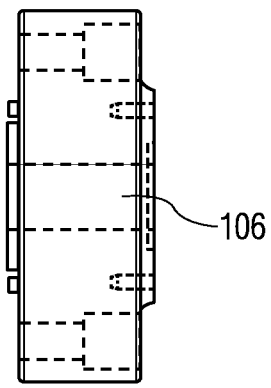
FIG. 6 illustrates a side view of the channel flange section of the present invention.

FIG. 6 illustrates a side view of the channel flange section 106.

Figure 10:
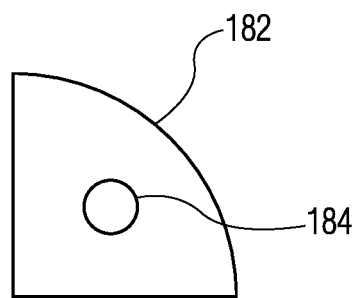
FIG. 10 illustrates a top/bottom view of the wedge segment of the present invention.
Figure 11:
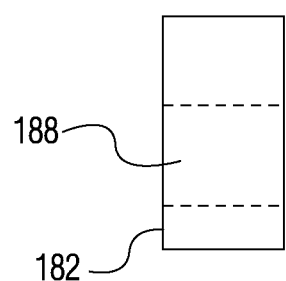
FIG. 11 illustrates a side view of the wedge segment of the present invention.
Figure 12:
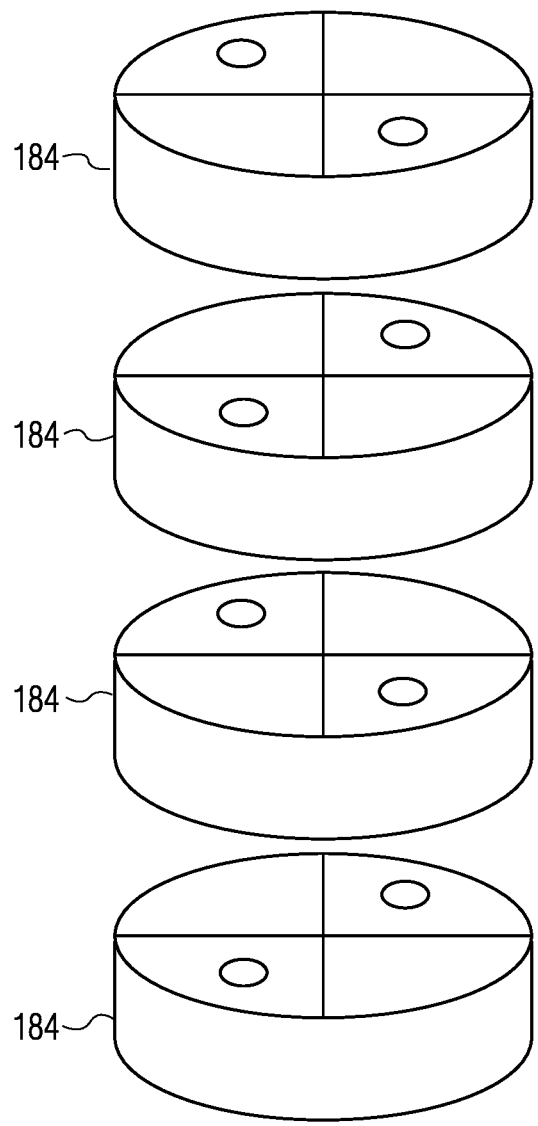
FIG. 12 illustrates a perspective view of wedge disks of the present invention. The various aspects of the present disclosure mentioned above are described in further detail with reference to the aforementioned figures and the following detailed description of exemplary embodiments.

FIG. 10 illustrates a top and/or bottom view of the wedge segment 182 which may be pie shaped and may or may not have a wedge aperture 188 to facilitate the flow of fluid through the basket device 112. FIG. 11 illustrates a side view of the wedge segment 182 including the wedge aperture 188. FIG. 12 illustrates a multitude of wedge disks, and a single wedge disk may include a multitude of wedge segments 182. The fluid may flow around the surfaces of the wedge segment surfaces and through the wedge aperture 188.

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A pulsation dampener to dampen pulsations in a fluid, comprising:
   a dampener device housing (107);
   a solid flange section (130) connected to the dampener device housing for the fluid to remain in the dampener device housing;
   a channel flange section (132) connected to the dampener device housing for the fluid to enter and exit the dampener device housing;
   wherein the dampening device housing includes a resilient dampener basket (114) therein holding a plurality of pulsation dampener layers (184) wherein each layer the plurality of layers comprises a plurality of ports (188) disposed thereon; the plurality of ports serving as entrance points on which the pulsating fluid is exerted wherein, each layer of the plurality of layers comprises four separate wedge-shaped segments (182); the segments positioned within basket such that, a first segment is placed adjacent to a second segment, the second segment is placed adjacent to a third segment, and the third segment is placed adjacent to a fourth segment.

2. A pulsation dampener to dampen pulsations in a fluid as in claim 1, wherein the dampener device housing includes an entrance basket section (108).

3. A pulsation dampener to dampen pulsations in a fluid as in claim 2, wherein the entrance basket section includes a narrowed section (122).

4. A pulsation dampener to dampen pulsations in a fluid as in claim 1, wherein the dampener device housing includes an exit section (110).

5. A pulsation dampener to dampen pulsations in a fluid as in claim 4, wherein the exit section includes a narrowed section (124).

6. A pulsation dampener to dampen pulsations in a fluid of claim 1 wherein, each segment of the plurality of segments comprises a gas-infused, closed-cell, rubber foam piece comprising a multiplicity of microcells of gas disposed therewithin.

7. A pulsation dampener to dampen pulsations in a fluid of claim 3, wherein the fluid includes a gas comprising nitrogen.

8. A pulsation dampener to dampen pulsations in a fluid of claim 1 wherein, the dampener basket is molded out of Nitrile Butadiene rubber.

9. A pulsation dampener to dampen pulsations in a fluid of claim 5 wherein, the Nitrile Butadiene rubber comprises hydrogenated Nitrile Butadiene rubber.

\* \* \* \* \*